(12) United States Patent
Moridi et al.

(10) Patent No.: US 11,197,126 B2
(45) Date of Patent: Dec. 7, 2021

(54) IDENTIFICATION OF USER'S HOME LOCATION

(71) Applicant: Honda Motor Co., Ltd., Tokyo (JP)

(72) Inventors: Armin Moridi, Torrance, CA (US); Hidehiro Tsubokura, Redondo Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 34 days.

(21) Appl. No.: 16/701,526

(22) Filed: Dec. 3, 2019

(65) Prior Publication Data

US 2021/0168560 A1 Jun. 3, 2021

(51) Int. Cl.
*H04W 4/02* (2018.01)
*H04W 4/029* (2018.01)
*G06Q 30/02* (2012.01)
*H04L 29/08* (2006.01)
*G06Q 10/10* (2012.01)
*G06Q 30/00* (2012.01)

(52) U.S. Cl.
CPC ........ *H04W 4/029* (2018.02); *G06Q 10/1093* (2013.01); *G06Q 30/016* (2013.01); *G06Q 30/0255* (2013.01); *G06Q 30/0261* (2013.01); *H04L 67/306* (2013.01)

(58) Field of Classification Search
CPC . H04W 4/029; G06Q 10/1093; G06Q 30/016; G06Q 30/0255; G06Q 30/0261; H04L 67/306
See application file for complete search history.

(56) References Cited

U.S. PATENT DOCUMENTS

| 8,566,028 | B2 | 10/2013 | Bradicich et al. |
| 9,519,722 | B1* | 12/2016 | Parikh ................. G06F 16/9537 |
| 10,163,113 | B2 | 12/2018 | Mehta et al. |
| 2013/0103378 | A1 | 4/2013 | Tinnakornsrisuphap et al. |
| 2014/0156394 | A1 | 6/2014 | Argue et al. |
| 2015/0154868 | A1 | 6/2015 | Neuner et al. |
| 2015/0213420 | A1 | 7/2015 | Krishnamurthy et al. |
| 2015/0213518 | A1 | 7/2015 | Krishnamurthy et al. |
| 2015/0213519 | A1 | 7/2015 | Krishnamurthy et al. |
| 2015/0279213 | A1 | 10/2015 | Balter et al. |
| 2017/0318418 | A1* | 11/2017 | Alizadeh-Shabdiz ....................... H04L 67/30 |

(Continued)

FOREIGN PATENT DOCUMENTS

DE 102010049988 A1 5/2012

*Primary Examiner* — Scott C Anderson
(74) *Attorney, Agent, or Firm* — American Honda Motor Co., Inc.; Aaron Fong

(57) ABSTRACT

A system and method for home identification is provided. The system selects a set of locations corresponding to a set of calendar dates from user's location history. Each location is associated with a dwell time period which is greater than a first threshold time-period. The system creates a location table by including the set of locations against the set of calendar dates and selects a first location from the location table based on whether a total number of day-wise occurrences of the first location in the location table is above a threshold number in a week period. The system determines a first count of weeks for which the total number of day-wise occurrences of the first location is above the threshold number and determines the first location as a user's home location based on whether the determined first count of weeks is above a threshold number of weeks.

17 Claims, 4 Drawing Sheets

(56) References Cited

U.S. PATENT DOCUMENTS

2019/0180382 A1    6/2019  Cowper et al.
2020/0126087 A1*   4/2020  Benkreira ............. H04W 4/021

\* cited by examiner

IDENTIFICATION OF USER'S HOME LOCATION

BACKGROUND

Locations-based services, such as location-based advertisements, have become a popular means to reach out to users living in a geographical region of interest. Typically, marketing data for users is tailored based on their current locations or registered home locations. In many instances, when a user moves to a new home location, the user may continue to receive notifications (e.g., location-specific ads) which may be irrelevant as such notifications may be related to a previous home location of the user.

Further limitations and disadvantages of conventional and traditional approaches will become apparent to one of skill in the art, through comparison of described systems with some aspects of the present disclosure, as set forth in the remainder of the present disclosure and with reference to the drawings.

SUMMARY

An exemplary aspect of the disclosure provides a system for identification of a user's home location. The system may select, from user's location history, a set of locations corresponding to a set of calendar dates. Each location of the selected set of locations may be associated with a dwell time period that may be greater than a first threshold time-period. The system may further create a location table by including the selected set of locations against the set of calendar dates and further select a first location from the location table based on whether a total number of day-wise occurrences of the first location in the location table is above a threshold number in a week period. The system may further determine a first count of weeks for which the total number of day-wise occurrences for the first location is above the threshold number and determine the first location as user's home location based on whether the determined first count of weeks is above a threshold number of weeks.

Another exemplary aspect of the disclosure provides a method for identification of a user's home location. The method may include selecting, from a user's location history, a set of locations corresponding to a set of calendar dates. Each location of the selected set of locations may be associated with a dwell time period that may be greater than a first threshold time-period. The method may further include creating a location table by including the selected set of locations against the set of calendar dates and selecting a first location from the location table based on whether a total number of day-wise occurrences of the first location in the location table is above a threshold number in a week period. The method may further include determining a first count of weeks for which the total number of day-wise occurrences for the first location is above the threshold number and determining the first location as user's home location based on whether the determined first count of weeks is above a threshold number of weeks.

Another exemplary aspect of the disclosure provides a non-transitory computer-readable medium. The non-transitory computer-readable medium may have stored thereon computer implemented instructions that, when executed by a system, causes the system to execute operations. The operations may include selecting, from a user's location history, a set of locations corresponding to a set of calendar dates. Each location of the selected set of locations may be associated with a dwell time period that may be greater than a first threshold time-period. The operations may further include creating a location table by including the selected set of locations against the set of calendar dates and selecting a first location from the location table based on whether a total number of day-wise occurrences of the first location in the location table is above a threshold number in a week period. The operations may further include determining a first count of weeks for which the total number of day-wise occurrences for the first location is above the threshold number and determining the first location as user's home location based on whether the determined first count of weeks is above a threshold number of weeks.

Figure 1:
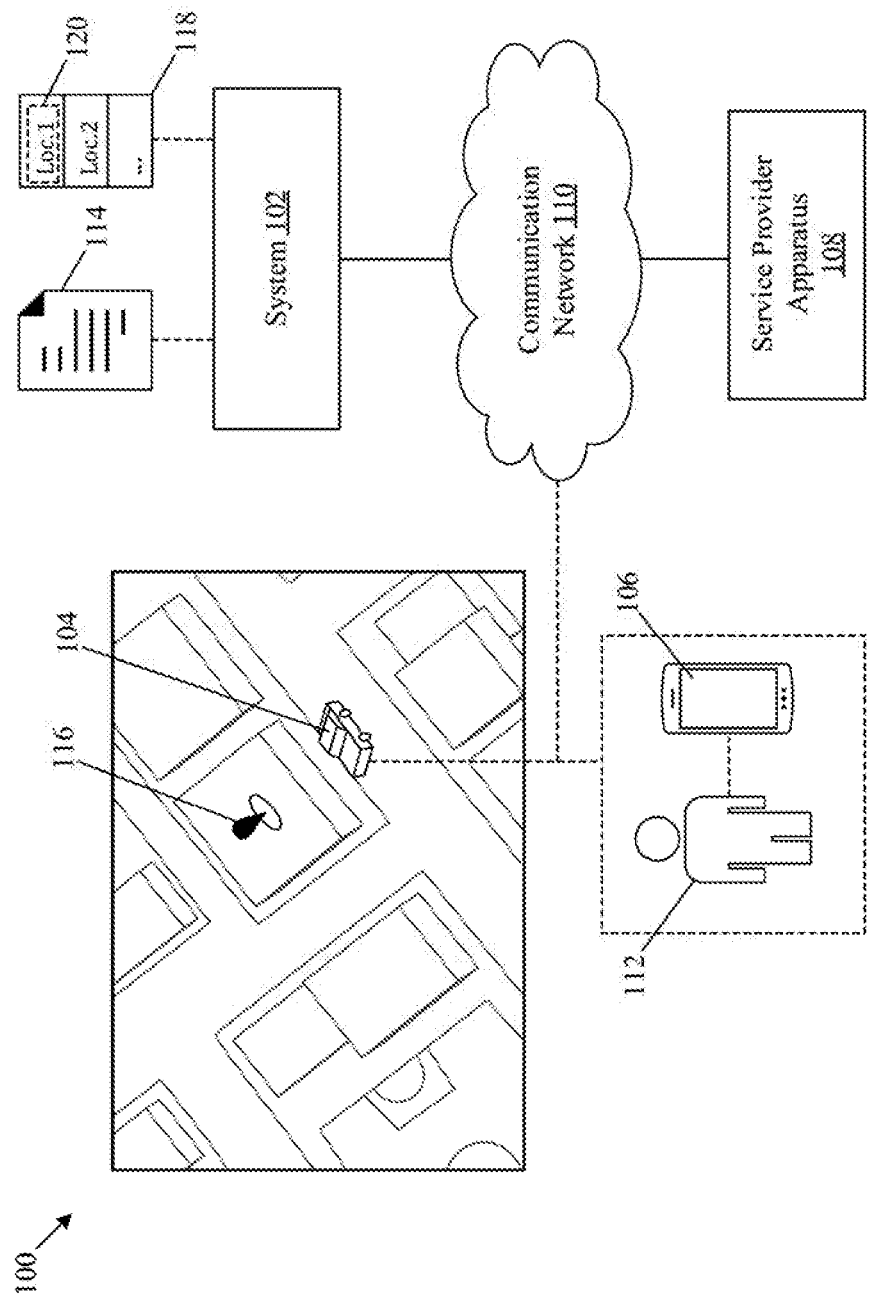
FIG. 1 is a diagram that illustrates an exemplary environment for identification of a user's home location, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed system for identification of a user's home location. The disclosed system relates to identification of a location where a user lives and typically starts his or her day. In many instances, locations which may be traditionally detected as a home location may not be where the user lives. Instead, such locations may be temporary locations, such as a resort or a hotel.

The disclosed system may rely on dwell time periods for locations which the user may have visited in two or more weeks, to determine a location as the user's home location. The disclosed system may create a location table comprising locations selected from user's location history, based on whether a dwell time period of each of the locations is greater than a threshold time-period, such as 3 hours. From the created location table, the disclosed system may select a candidate location for which a total number of day-wise occurrences in the location table is above a threshold number (e.g., 5) in a week period. The disclosed system may determine a count of weeks for which the total number of day-wise occurrences for the candidate location is above the threshold number. In case of the determined count of weeks is above a threshold number of weeks (such as two weeks), the disclosed system may determine the candidate location as the user' home location.

The disclosed system provides a robust method for identification of the user's home location as it applies location filters on locations recorded in the user's location history to create a location table that includes suitable candidate locations for the user's home location. Further filters/conditions are applied on the location table to select a candidate location which may be most likely to be the user's home location. The disclosed system may also rely on other factors, such as locations with a highest dwell time on holidays or locations provided in vehicle registration information, to validate the candidate location as the user's home location.

As the user's location history is periodically updated, the disclosed system may be able to robustly monitor changes in the user's home location and share updates related to the user's home location with service providers, who may be interested in serving location-specific services to the user based on the user's home location. These service providers may be able to create new services or user-targeted content, such as ads, tailor based on the user's home location and updates related to changes in the user's home location.

FIG. 1 is a diagram that illustrates an exemplary environment for identification of a user's home location, in accordance with an embodiment of the disclosure. With reference to FIG. 1, there is shown a diagram of an exemplary environment 100. The exemplary environment 100 may include a system 102, a vehicle 104, a portable electronic device 106, a service provider apparatus 108, and a communication network 110. The system 102, the vehicle 104, the portable electronic device 106, and/or the service provider apparatus 108 may be configured to communicate with each other, via the communication network 110. In the exemplary environment 100, there is shown a user 112 who may be associated with the vehicle 104 and the portable electronic device 106, for example, a smartphone.

The system 102 may include suitable logic, circuitry, interfaces, and/or code that may be configured to analyze a user's location history 114 to determine a user's home location 116. The system 102 may be configured to track changes in the user's home location 116 based on a location table 118 that may include date-wise records of user's locations. The user's home location 116 may be utilized by the system 102 to serve user-targeted content, such as advertisements. Examples of the system 102 may include, but are not limited to, an application server or a web server, a cloud server (or a cluster of cloud servers), a consumer-electronic (CE) device (such as a smartphone or a laptop), a workstation, or an in-vehicle Electronics Control Unit (ECU).

The vehicle 104 may include a location sensor, such as a Global Navigation Satellite System (GNSS) receiver to record locations and associated metadata of the vehicle 104. The recorded locations and associated with metadata may be synched to a user database, which may be maintained on a node of the system 102.

The vehicle 104 may be a non-autonomous vehicle, a semi-autonomous vehicle, or a fully autonomous vehicle, for example, as defined by National Highway Traffic Safety Administration (NHTSA). Examples of the vehicle 104 may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. Examples of the vehicle 104 may include, but are not limited to, an electric car, an internal combustion engine (ICE)-based car, an electric car, a fuel-cell based car, a solar powered-car, or a hybrid car.

The portable electronic device 106 may include suitable logic, circuitry, and interfaces that may be configured to collect user information, such as location information of the user 112 at different time-steps of a day. The collected user information may be shared with the system 102, via the communication network 110. Examples of the portable electronic device 106 may include, but are not limited to, a tablet, a smartphone, a cellular phone, a smart speaker, a gaming device, a wearable device, such as a smartwatch or a smart band, and/or other consumer electronic (CE) devices.

The service provider apparatus 108 may include suitable logic, circuitry, and interfaces that may be configured to store user-targeted content which may be tailored based on the user's home location 116 and served on a user device (e.g., the portable electronic device 106). The user-targeted content may include, for example, targeted marketing data, service notifications, offers, announcements, advertisements, and the like. Examples of the service provider apparatus 108 may include, but are not limited to, a computing device, a mainframe machine, a computer workstation, an application server, a cloud server, a web server, a database server, a file server, and/or a mainframe server.

The communication network 110 may include a communication medium through which the system 102, the vehicle 104, the portable electronic device 106, and the service provider apparatus 108 may communicate with each other. The communication network 110 may be one of a wired connection or a wireless connection Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the exemplary environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may initialize a process to access the user's location history 114, which may be collected on the vehicle 104 associated with user 112 or the portable electronic device 106. The user's location history 114 may include, for example, day-wise information of all trips in a day, durations of all the trips, locations where the user 112 dwells in-between all the trips, or all dwell times between consecutive trips in a day. Herein, it may be assumed that the portable electronic device 106 is almost always with the user 112 and the vehicle 104 is registered in the user's name. Thus, the location of the portable electronic device 106 or the vehicle 104 may be indicative of a location of the user.

In at least one embodiment, the system 102 may acquire a plurality of location values of the portable electronic device 106 or the vehicle 104 over a period of a set of calendar dates (e.g., everyday over a 6 months period) and may create the user's location history 114 based on the acquired plurality of location values. For each location value recorded in the user's location history 114, the user's location history 114 may include datapoints as metadata, such as a dwell time period, an arrival time, or a departure time. Also, a duration between two consecutive locations may also be recorded as a datapoint in the user's location history 114. These datapoints may be further tagged with a day tag and/or a calendar date on which these datapoints were acquired from the vehicle 104 and/or the portable electronic device 106. The dwell time period for a location value may be a duration for which the user 112 may have stayed at the location. As an example, if the user 112 stays in a location_1 between 9:00 AM and 5:00 PM, then the dwell time period for the location_1 may be computed as 8 hours. Whereas, if the user 112 leaves from the location_1 at 11:30 AM to a location_2 and stays at the location_2 from 12:00 PM to 1:00 PM and then returns back to the location_1 at 1:30 PM to further stay till 5:00 PM, then the dwell time and the trip time may be determined as shown in Table 1:

TABLE 1

Location Status and Trip/Dwell Time Durations

| Date/Day | Time Stamps | Location Status | Duration |
|---|---|---|---|
| Jan. 12, 2019/ Monday | 9:00 AM-11:30 AM | Location_1 | Dwell Time = 2.5 hours |
| Jan. 12, 2019/ Monday | 11:30 AM-12:00 PM | Trip from Location_1 to Location_2 | Trip Time = 0.5 hour |
| Jan. 12, 2019/ Monday | 12:00 PM-1:00 PM | Location_2 | Dwell Time = 1 hour |
| Jan. 12, 2019/ Monday | 1:00 PM-1:30 PM | Trip from Location_2 to Location_1 | Trip Time = 0.5 hour |
| Jan. 12, 2019/ Monday | 1:30 PM-5:00 PM | Location_1 | Dwell Time = 3.5 hours |

In some embodiments, from the user's location history 114, the system 102 may filter locations for which a dwell time period is below a set threshold period. This may help to filter out noise, i.e., locations associated with places or situations, such as a public restroom, a traffic jam, a busy intersection, or a blockade. For example, to detect whether a location is to be recorded as a user's dwell location, the vehicle 104 may detect whether the engines of the vehicle 104 are set off for more than or equal to a set threshold period of 60 minutes.

From the user's location history 114, the system 102 may select a set of locations corresponding to a set of calendar dates. Each location in the selected set of locations may be associated with a dwell time period, which may be greater than a first threshold time-period, for example, 3 hours. Additionally, or alternatively, for each location of the selected set of locations, the dwell time period may be between an originating trip of a respective day and a last trip taken just before the originating trip. In such a case, a location recorded before the originating trip of a respective day and after the last trip taken just before the originating trip, may be considered as a first origin location for the user 112 on the respective day. Such location may be considered as a good candidate for the user's home location 116 as the user 112 may most likely be at home after his/her last trip of a day and before an originating trip of the next day.

The system 102 may create the location table 118 by including the selected set of locations against the set of calendar dates. Details of the creation of the location table 118 are explained in detail, for example, in FIG. 3. Once the location table 118 is created, the system 102 may select a first location 120 from the location table 118 as a candidate for the user's home location 116 based on whether a total number of day-wise occurrences of the first location 120 in the location table 118 is above a threshold number (for example, 5 or 6) in a week period. For example, if a location may have more than or equal to 5 occurrences in the location table 118 on 5 out of 7 days of a week and a dwell time of 3 hours or more, then that location may be selected from the location table 118 as a candidate for the user's home location 116.

It may be checked whether a similar pattern exists in subsequent weeks of the calendar. From the location table 118, the system 102 may determine a first count of weeks for which the total number of day-wise occurrences for the first location 120 is above the threshold number. Based on a determination that the determined first count of weeks is above a threshold number of weeks (e.g., 2 weeks), the system 102 may determine the first location 120 as the user's home location 116. if the determined first count of weeks is less than the threshold number of weeks, the system 102 may discard the first location 120 as the candidate for the user's home location 116. In such instances, another location may be selected as a candidate location from the location table 118 by repeating the abovementioned process.

The system 102 may utilize the user's home location 116 to share user-targeted content with the user 112. Additionally, or alternatively, the system 102 may allow service providers, such as vehicle dealerships, to collect the user's home location 116 and generate user-targeted content based on the user's home location 116. These service providers may use the service provider apparatus 108 to share the user-targeted content with a user device, such as a smartphone. Further details of operations performed by the system 102 and embodiments of the present disclosure are explained, for example, in FIG. 3.

Figure 2:
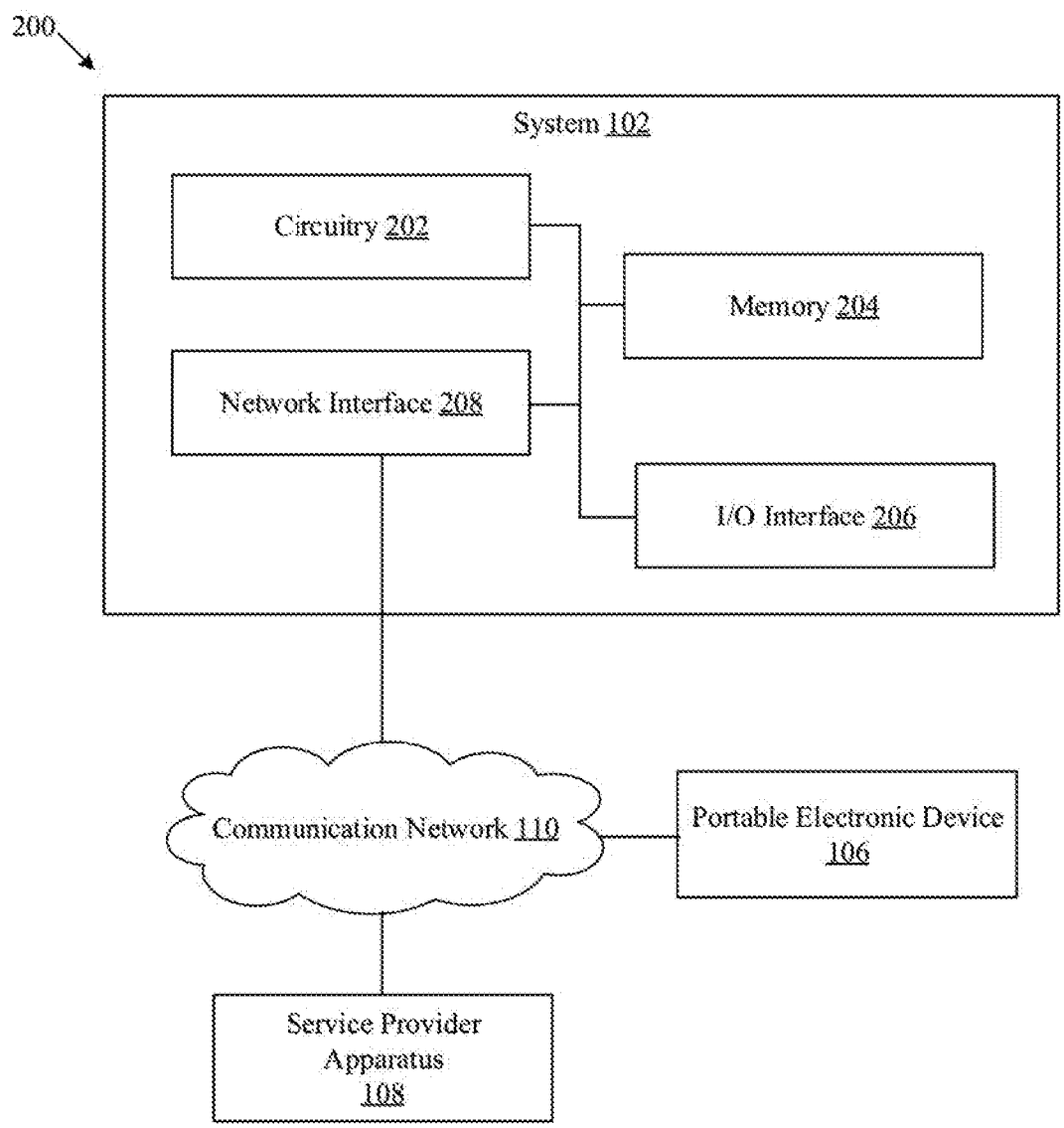
FIG. 2 is a block diagram of a system for identification of a user's home location, in accordance with an embodiment of the disclosure.

FIG. 2 is a block diagram of a system for identification of a user's home location, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, and an input/output (I/O) interface 206, and a network interface 208.

The circuitry 202 may include suitable logic, circuitry, and/or interfaces that may be configured to execute program instructions associated with different operations to be executed by the system 102. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single circuitry in FIG. 2, the circuitry 202 may include any number of processors configured to, individually or collectively, perform or direct performance of any number of operations of the system 102, as described in the present disclosure. Additionally, one or more of the processors may be present on one or more different electronic devices, such as different servers. In some embodiments, the circuitry 202 may be configured to interpret and/or execute program instructions and/or process data stored in the memory 204 and/or a persistent data storage. In some embodiments, the circuitry 202 may fetch program instructions from a persistent data storage and load the program instructions in the memory 204. After the program instructions are loaded into the memory 204, the circuitry 202 may execute the program instructions. Some of the examples of the circuitry 202 may be a Graphical Processing Unit (GPU), a Central Processing Unit (CPU), a Reduced Instruction Set Computer (RISC) processor, an Application-Specific Integrated Circuit (ASIC) processor, a Complex Instruction Set Computer (CISC) processor, a co-processor, and/or a combination thereof.

The memory 204 may include suitable logic, circuitry, interfaces, and/or code that may be configured to store the program instructions executable by the circuitry 202. The memory 204 may be configured to store information that may include at least the user's location history 114, the user's home location 116, or the location table 118. In certain embodiments, the memory 204 may be configured to store operating systems and associated application-specific information. The memory 204 may include computer-readable storage media for carrying or having computer-executable instructions or data structures stored thereon. Such computer-readable storage media may include any available media that may be accessed by a general-purpose or a special-purpose computer, such as the circuitry 202. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the circuitry 202 to perform a certain operation or a group of operations associated with the system 102.

The I/O interface 206 may include suitable logic, circuitry, and interfaces that may be configured to receive a user input and provide an output based on the received input. The I/O interface 206 which includes various input and output devices, may be configured to communicate with the circuitry 202. Examples of the I/O interface 206 may include, but are not limited to, a touch screen, a keyboard, a mouse, a joystick, a microphone, a display, and a speaker.

The network interface 208 may include suitable logic, circuitry, interfaces, and/or code that may facilitate a communication among the system 102 and other external devices, such as the vehicle 104, the portable electronic device 106, and the service provider apparatus 108, via the communication network 110. The network interface 208 may implement known technologies to support wired and/or wireless communication via the communication network 110. The network interface 208 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wired and/or wireless communication with networks, such as the Internet, an Intranet and/or a wireless network, such as a cellular telephone network, a wireless local area network (LAN) and/or a metropolitan area network (MAN). The communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The functions or operations executed by the system 102, as described in FIG. 1, may be performed by the circuitry 202. Operations executed by the circuitry 202 are described in detail, for example, in the FIG. 3.

Figure 3:
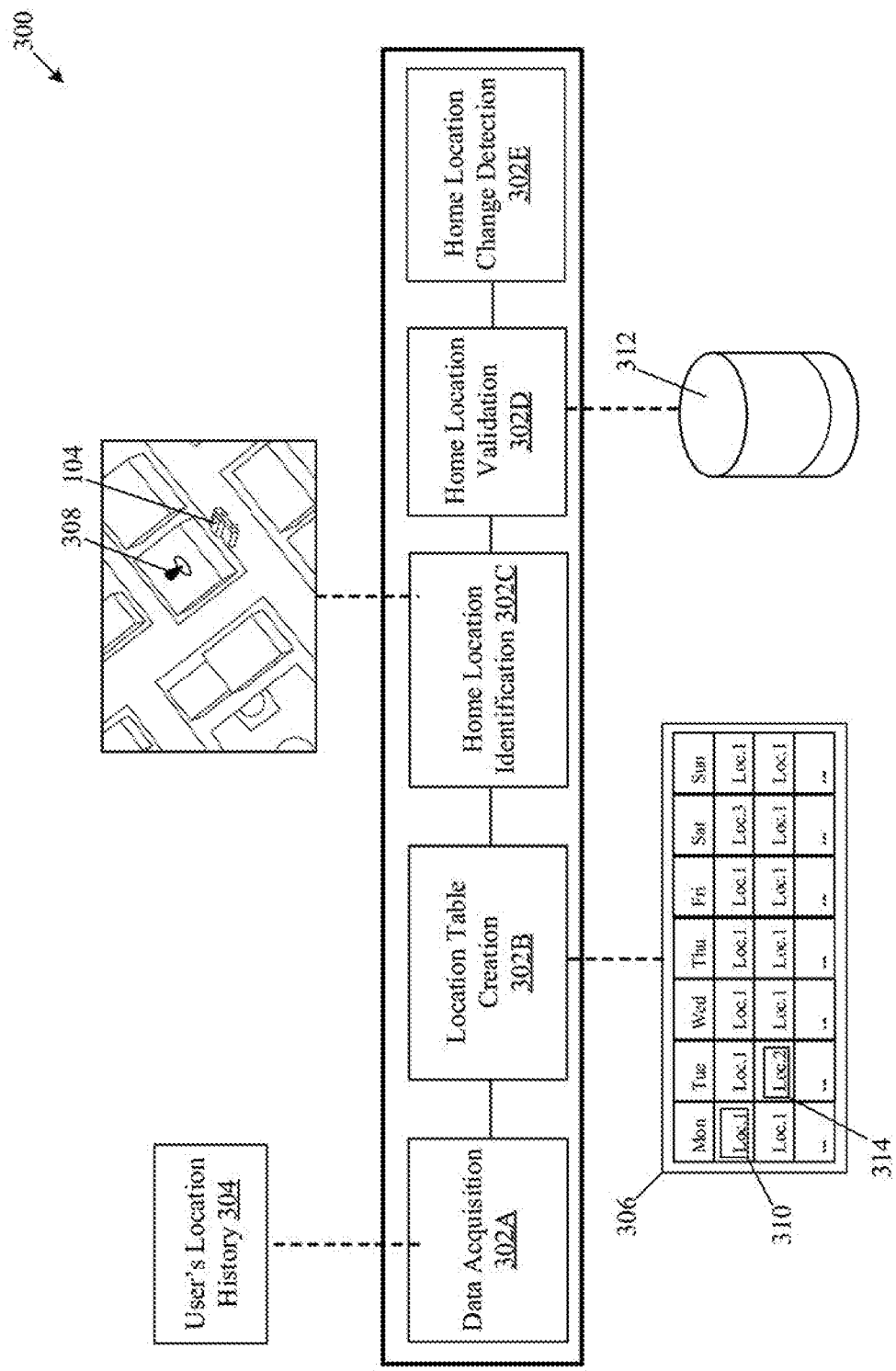
FIG. 3 is a diagram that illustrates exemplary operations for identification of a user's home location, in accordance with an embodiment of the disclosure.

FIG. 3 is a diagram that illustrates exemplary operations for identification of a user's home location, in accordance with an embodiment of the disclosure. FIG. 3 is explained in conjunction with elements from FIG. 1 and FIG. 2. With reference to FIG. 3, there is shown a diagram 300 to depict exemplary operations from 302A to 302F. The exemplary operations illustrated in the diagram 300 may start at 302 and may be performed by any computing system, apparatus, or device, such as by the system 102 of FIG. 1 or FIG. 2. Although illustrated with discrete blocks, the operations associated with one or more of the blocks of the diagram 300 may be divided into additional blocks, combined into fewer blocks, or eliminated, depending on the particular implementation.

At 302A, data acquisition may be performed. For data acquisition, the system 102 may acquire a plurality of location values of at least one of: the vehicle 104 or the portable electronic device 106, as described above in FIG. 1.The plurality of location values may be acquired over a period (e.g., at least a two week period). Along with location values, the system 102 may acquire datapoints, such as date-time stamp(s) for each location value. For example, such date-time stamp(s) may include an arrival date-time stamp and a departure date-time stamp for every location value. An example of datapoints for location values is provided in Table 2, as follows:

TABLE 2

Example of Datapoints for Location Values

| Location | Arrival Date-Time | Departure Date-Time |
|---|---|---|
| Loc. 1 | Nov. 2, 2019 11:00 PM | Nov. 3, 2019 09:30 AM |
| Loc. 2 | Nov. 3, 2019 10:10 AM | Nov. 3, 2019 1:00 PM |
| Loc. 3 | Nov. 3, 2019 1:10 PM | Nov. 3, 2019 1:40 PM |
| Loc. 2 | Nov. 3, 2019 1:50 PM | Nov. 3, 2019 7:00 PM |
| Loc. 1 | Nov. 3, 2019 7:40 PM | Nov. 4, 2019 9:30 AM |

In Table 2, Loc.1, Loc.2, and Loc.3 are merely representative terms for locations values and should not be construed as limiting for the disclosure. In practice, Loc.1, Loc.2, and Loc.3 may be represented by latitude and longitude values, for example. It should be noted that location values and datapoints for the location values may be collected daily for a period of 2 weeks.

The system 102 may compute a dwell time period for each location based on a difference between the departure date-time and the arrival date-time. For example, for Loc.3 in Table 2, the dwell time period may be determined as a difference between 1:40 PM and 1:10 PM, i.e. 30 minutes. Similarly, the system 102 may compute a trip time period between two consecutive locations as difference in departure date-time for a first location and an arrival date-time for a second location. For example, in Table 2, a trip time period of a trip from Loc.2 to Loc.1 may be computed as 40 minutes, i.e. 7:40 PM-7:00 PM.

In at least one embodiment, the system 102 may also determine a location tag for each location value that may be acquired from at least one of: the vehicle 104 or the portable electronic device 106. The location tag for a location value may indicate a type of built environment established on that location. Examples of the location tag may include, but are not limited to, an office space, a residential space, a road, a hospital, a shopping complex, an airport complex, a commercial building, a hotel, a garden, or an educational institution. Using the location tag, the system 102 may be able to filter out location values which may not be associated with a residential space or a road adjoining a residential space.

The system 102 may create user's location history 304 based on acquired plurality of location values and the datapoints associated with the plurality of location values. In some instances, a location tag for each location value may be included in the user's location history 304.

At 302B, a location table 306 may be created. For the location table 306, the system 102 may select a set of locations from the user's location history 304. The selected set of locations may correspond to a set of calendar dates. Each location of the selected set of locations may be associated with a dwell time period that may be greater than a first threshold time-period, for example, 3 hours. Additionally, or alternatively, for each calendar date, a location just before an originating trip of that calendar date may be selected. More specifically, for each location of the set of locations, the dwell time period may be between an originating trip of a respective day and a last trip taken just before the originating trip. An example of location selection from example datapoints of the user's location history 304 is provided herein in Table 3, as follows:

TABLE 3

Example Datapoints of User's Location History

| Trip | Day of Trip | Departure Location |
|---|---|---|
| Trip_1 | Day_1 | Loc. 1 |
| Trip_2 | Day_1 | Loc. 2 |
| Trip_3 | Day_1 | Loc. 1 |
| Trip_4 | Day_2 | Loc. 1 |
| ... | ... | ... |

From Table 3, Trip_1 and Trip_4 may be a first trip for Day_1 and Day_2, respectively. Thus, the system 102 may only select Loc.1 for both Day_1 and Day_2 as Loc.1 is an origin location for the user 112 on both Day_1 and Day_2. Other datapoints, such as for Trip_2 and Trip_3 may not be considered for selection. Loc.1 may be considered as a good candidate for user's home location 308 as the user 112 may most likely be at home after his/her last trip of a day and before an originating trip of the next day.

The system 102 may create the location table 306 by including the selected set of locations against the set of calendar dates. The system 102 may populate each field of the location table 306 with the selected set of locations from the user's location history 304. An example of the location table 306 is provided in Table 4, as follows:

TABLE 4

Example of Location table

| Monday | Tuesday | Wednesday | Thursday | Friday | Saturday | Sunday |
|---|---|---|---|---|---|---|
| Loc. 1 | Loc. 1 | Loc. 1 | Loc. 1 | Loc. 1 | Loc. 3 | Loc. 1 |
| Loc. 1 | Loc. 1 | Loc. 1 | Loc. 1 | Loc. 1 | Loc. 1 | Loc. 1 |
| Loc. 1 | Loc. 1 | Loc. 1 | Loc. 1 | Loc. 1 | Loc. 1 | Loc. 1 |
| Loc. 1 | Loc. 1 | Loc. 2 | Loc. 1 | Loc. 1 | Loc. 2 | Loc. 1 |
| ... | ... | ... | ... | ... | ... | ... |

In Table 4, a selected set of locations are depicted for a set of calendar dates associated with a four week period. Each cell in the first row may depict a day of a week. In subsequent rows, each cell may include a location selected for an associated calendar date. As shown, for week 1, Loc.1 may be selected for all days of the week, expect for Saturday, from the user's location history 304. For Saturday, Loc.3 may be selected.

At 302C, the user's home location 308 may be identified. For the user's home location 308, the system 102 may apply at least two location filters on the location table 306, as described herein. In order to apply the first location filter, the system 102 may compute a total number of day-wise occurrences of every location in the location table 306 in a week period. An example of total number of day-wise occurrences of every location in Table 4, is provided in Table 5, as follows:

TABLE 5

Total Number of Day-Wise Occurrences of Location(s) in Location Table

| Week | Location | Total Number of Day-Wise Occurrences |
|---|---|---|
| Week 1 | Loc. 1 | 6 |
| Week 1 | Loc. 2 | 1 |
| Week 2 | Loc. 1 | 7 |
| Week 3 | Loc. 1 | 7 |
| Week 4 | Loc. 1 | 5 |
| Week 4 | Loc. 2 | 2 |
| ... | ... | ... |

With the first location filter, the system 102 may select a first location 310 from the location table 306 as a candidate for the user's home location 308 based on whether a total number of day-wise occurrences of the first location 310 in the location table 306 is above a threshold number (e.g., 5) in a week period. Alternatively, the system 102 may reject the first location 310 as a candidate for the user's home location 308 based on whether the total number of day-wise occurrences of the first location 310 in the location table 306 is less than the threshold number in the week period. For example, with reference to Table 4 and Table 5, if the threshold number is 5 for a week period, then the first location 310 for every week may be given by Table 6, as follows:

TABLE 6

Candidate Location for User's Home Location

| Week | First Location |
|---|---|
| Week 1 | Loc. 1 |
| Week 2 | Loc. 1 |
| Week 3 | Loc. 1 |
| Week 4 | Indeterminate |
| ... | ... |

From Table 5, it may be determined that for Week 1, Week 2, and Week 3, the total number of day-wise occurrences for Loc.1 is above 5, i.e. the threshold number. Whereas, for Week 4, the total number of day-wise occurrences for both Loc.1 and Loc.2 is less than 5. Thus, Loc.1 may be selected as a candidate for the user' home location 308 for Week 1, Week 2, and Week 3. For Week 4, no selection may be performed, as indicated by the term "Indeterminate" in Table 6.

The system 102 may determine a first count of weeks for which the day-wise occurrences for the first location 310 is above the threshold number. For example, from Table 5 and Table 6, the first count of weeks for Loc.1 and Loc.2 over a four week period is shown in Table 7, as follows:

TABLE 7

Count of Weeks for Locations

| Location | Count of Weeks |
|---|---|
| Loc. 1 | 3 |
| Loc. 2 | 0 |

After the determination of the first count of weeks, the system 102 may determine whether the determined first count of weeks is above a threshold number of weeks, for example, a two week period. For example, if Loc.1 is a candidate for the user's home location 308 for Week 1, then it may need to be checked if a similar pattern for Loc.1 appears for Week 2 or subsequent weeks in location table 306. In case the first count of weeks is above the threshold number of weeks, the system 102 may determine the first location 310 as the user's home location 308.

In at least one embodiment, the system 102 may determine a total number of days associated with the set of calendar dates and may compute a ratio of the total number of day-wise occurrences of the first location 310 to the determined total number of days. The first location 310 may be determined as the user's home location 308 further based on whether the computed ratio is equal or above a threshold ratio, for example, 0.7 or 70%. For example, from Table 4 and Table 5, the total number of days and the total number of day-wise occurrences of the first location 310 may be determined as 28 and 25, respectively. The ratio of the total number of day-wise occurrences of the first location 310 to the determined total number of days may be computed as 25/28, i.e. 0.89 or 89%. As the computed ratio is above 70%, the first location 310, i.e. Loc.1 may be determined as the user's home location 308.

At 302D, a validation of the user's home location 308 may be performed. After the identification of the first location 310 as the user's home location 308, the system 102 may validate whether the first location 310 is the user's home location 308. Exemplary embodiments for validation are provided herein.

In one exemplary embodiment, the system 102 may retrieve, from a user database 312, electronic-Customer Relationship Management (e-CRM) data associated with the user 112. Based on the retrieved e-CRM data, the system 102 may determine vehicle registration information for the vehicle 104. The system 102 may validate the first location 310 as the user's home location 308 based on the determined vehicle registration information. Specifically, it may be determined whether the user's home location 308 as per the vehicle registration information is same as the first location 310 that is determined to be the user's home location 308. In case of a match, the first location 310 may be validated as the user's home location 308. Otherwise, in case of a mismatch, other validation methods may be implemented to decide if the first location 310 is a new home location or a temporary home location where the user 112 may have stayed. Such temporary home locations can be associated with a vacation or a stay in a resort for a period of two or more weeks and therefore, may need to be rejected for selection as the user's home location 308.

In another exemplary embodiment, the system 102 may determine a first date from the set of calendar dates as a holiday (for example, Christmas or Thanksgiving). It may be assumed that the dwell time period of the user 112 may be a maximum for the user's home location 308 on a holiday, such as Christmas or Thanksgiving. Therefore, the system 102 may validate the first location 310 as the user's home location 308 based on a determination that the dwell time period for the first location 310 is a maximum on the determined first date, i.e. a holiday.

In another exemplary embodiment, the system 102 may determine, from the user's location history 304, two or more locations for each calendar date of the set of calendar dates. The dwell time period associated with each of the two or more locations may be greater than or equal to the first threshold time-period, for example, 3 hours. An example of such determination for Day_1 is provided in Table 8, as follows:

TABLE 8

Dwell Time Period for Different Locations on Day_1

| Day | Dwell Time Period (Hours) | Location |
|---|---|---|
| Day_1 | 5 | Loc. 3 |
| Day_1 | 0.8 | Loc. 2 |
| Day_1 | 4 | Loc. 3 |
| Day_1 | 12 | Loc. 1 |
| ... | ... | ... |

From Table 8, for Day_1, Loc.3 and Loc.1 have a dwell time period of 9 hours and 12 hours, respectively. Loc.1 and Loc.3 may be selected as candidate locations for the user's home location 308 as the dwell time period for Loc.1 and Loc.3 is more than 3 hours. Whereas, the dwell time period for Loc.2 is 0.8 hour and therefore, Loc.2 may be discarded for selection as a candidate for the user's home location 308. It should be noted that the dwell time period may be vary on other days for each of Loc.1, Loc.2, and Loc.3.

For each location of the selected two or more locations, the system 102 may compute a total dwell time period over a period of the set of calendar dates. The system 102 may determine whether the computed dwell time period for the first location 310 of the two or more locations is above a second threshold time-period, for example, 150 hours. In case the total dwell time-period for the first location 310 is determined to be above the second threshold time-period, the system 102 may validate the first location 310 as the user's home location 308. Alternatively, it may be determined if the total dwell time period for the first location 310 is a maximum among remaining locations of the selected two or more locations. In case the total dwell time period for the first location 310 is a maximum for at least a two week period, then the system 102 may validate the first location 310 as the user's home location 308. An example of the computed total dwell time period for Loc.1, Loc.2, and Loc.3 over multiple instances of a two week period is provided in Table 9, as follows:

TABLE 9

Total Dwell Time Period for Multiple Locations

| Week Period | Selected Locations:<br>Total Dwell Time Period | User's Home Location |
| --- | --- | --- |
| Week 1-<br>Week 2 | Loc. 1: 250 Hours<br>Loc. 2: 30 Hours<br>Loc. 3: 20 Hours | Loc. 1 |
| Week 3-<br>Week 4 | Loc. 1: 180 Hours<br>Loc. 2: 80 Hours<br>Loc. 3: 40 Hours | Loc. 1 |
| Week 5-<br>Week 6 | Loc. 1: 220 Hours<br>Loc. 2: 20 Hours<br>Loc. 3: 60 Hours | Loc. 1 |
| Week 7-<br>Week 8 | Loc. 1: 280 Hours<br>Loc. 2: 20 Hours<br>Loc. 3: 0 Hour | Loc. 1 |
| ... | ... | ... |

From Table 9, it is evident that the total dwell time period of Loc.1 is a maximum among Loc.1, Loc.2, Loc.3 for Week 1-Week 2, Week 3-Week 4, Week 5-Week 6, and Week 7-Week 8. Therefore, Loc.1 may be selected as the user's home location 308 and may be used to validate the first location 310 previously selected at 302C as the user's home location 308.

At 302E, a home location change may be detected. For a change in the user's home location, it may be assumed that a different location in the location table 306 may satisfy conditions of the first location filter and/or the second location filter. For example, the system 102 may select a second location 314 from the location table 306 based on a whether a total number of day-wise occurrences of the second location 314 in the location table 306 is above a threshold number (e.g., 5) in a week period. The system 102 may determine a second count of weeks for which the total number of day-wise occurrences for the second location 314 is above the threshold number. In case the determined second count of weeks is above a threshold number of weeks, the system 102 may reject the first location 310 as the user's home location 308 and update the user's home location 308 as the second location 314.

Additionally, or alternatively, the system 102 may detect a change in the user's home location 308 based on whether the first location 310 is validated as the user's home location 308 at 302D. For example, the system 102 may identify the user's home location 308 (as described at 302C) and then match the user's home location 308 with a user's home location in the vehicle registration information. Accordingly, the system 102 may identify the change in the user's home location 308 based on a result of the match. If the user's home location 308 does not match with the user's home location in the vehicle registration information, then the system 102 may detect that the user's home location 308 may have changed and may repeat the process of 302A to 302C to determine another candidate from the location table 306 as the user's home location 308.

At 302F, the user's home location 308 may be shared with service providers. For example, the service providers may be vehicle dealerships available in locality of the user's home location 308 or advertiser networks that serve location-specific ads in the user's home location 308. The system 102 may share user information that may include the user's home location 308 with the service provider apparatus 108, via the communication network 110. The service provider apparatus 108 may prepare user-targeted content based on the shared user information. The user-targeted content may include, for example, vehicle recommendations, hyperlocal offers or services, advertisements, notifications for different services available in the locality of the user's home location 308, and the like. The system 102 may receive, via the communication network 110, the user-targeted content from the service provider apparatus 108 and may share the user-targeted content with at least the vehicle 104 or the portable electronic device 106.

Although the diagram 300 is illustrated as discrete operations, such as 302A, 302B, 302C, 302D, 302E, and 302F, however, in certain embodiments, such discrete operations may be further divided into additional operations, combined into fewer operations, or eliminated, depending on the particular implementation without detracting from the essence of the disclosed embodiments.

Figure 4:
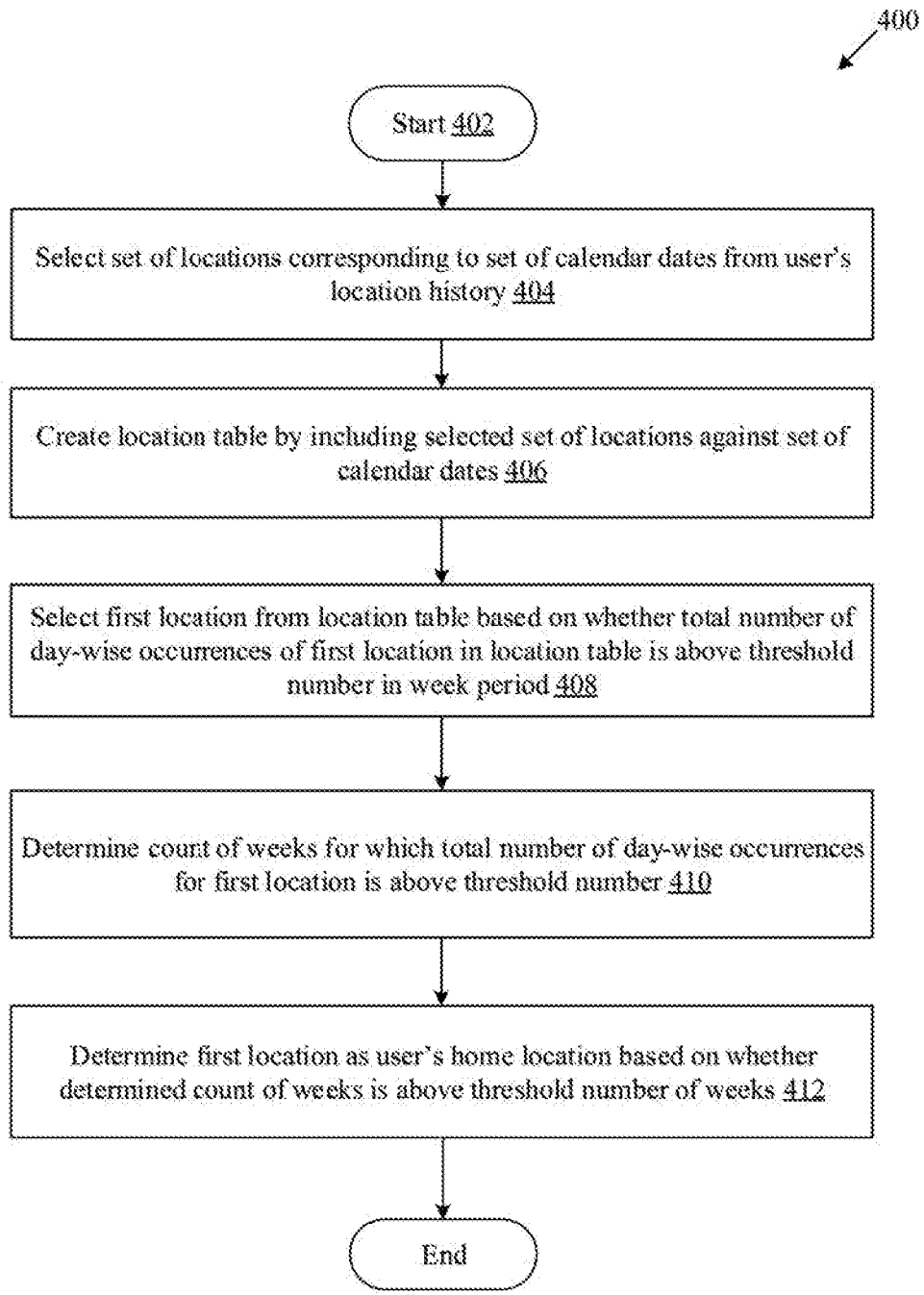
FIG. 4 illustrates a flowchart of an exemplary method for identification of a user's home location, in accordance with an embodiment of the disclosure.

FIG. 4 illustrates a flowchart of an exemplary method for identification of a user's home location, in accordance with an embodiment of the disclosure. FIG. 4 is explained in conjunction with elements from FIGS. 1, 2, and 3. With reference to FIG. 4, there is shown a flowchart 400. The method illustrated in the flowchart 400 may start at 402 and proceed to 404. The method illustrated in the flowchart 400 may be performed by any computing system, apparatus, or device, such as by the circuitry 202 of the system 102.

At 404, a set of locations corresponding to a set of calendar dates may be selected from the user's location history 114. In at least one embodiment, the circuitry 202 may be configured to select, from the user's location history 114, the set of locations corresponding to the set of calendar dates. Each location of the set of locations may be associated with a dwell time period that may be greater than the first threshold time-period, for example, 3 hours.

At 406, the location table 118 may be created by including the selected set of locations against the set of calendar dates. In at least one embodiment, the circuitry 202 may be configured to create the location table 118 by including the set of locations against the set of calendar dates.

At 408, the first location 120 may be selected from the location table 118 based on a determination that a total number of day-wise occurrences of the first location 120 in the location table 118 is above a threshold number in a week period. In at least one embodiment, the circuitry 202 may be configured to select the first location 120 from the location table 118 based on a determination that the total number of day-wise occurrences of the first location 120 is above the threshold number in the week period.

At 410, a count of weeks for which the total number of day-wise occurrences for the first location 120 is above the threshold number may be determined. In at least one embodiment, the circuitry 202 may be configured to determine the count of weeks for which the total number of the day-wise occurrences for the first location 120 is above the threshold number.

At 412, the first location 120 may be determined as the user's home location 116 based on a determination that the determined count of weeks is above a threshold number of weeks. In at least one embodiment, the circuitry 202 may be configured to determine the first location 120 as the user's home location 116 based on a determination that the determined count of weeks is above the threshold number of weeks (for example, 2 weeks). Control may pass to end.

The flowchart 400 is illustrated as discrete operations, such as 404, 406, 408, 410, and 412. However, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate a system for identification of a user's home location. The instructions may cause the machine and/or computer to perform operations that include selecting, from user's location history, a set of locations corresponding to a set of calendar dates. Each location of the selected set of locations is associated with a dwell time period that is greater than a first threshold time-period. The operations may further include creating a location table by including the selected set of locations against the set of calendar dates and selecting a first location from the location table based on whether a total number of day-wise occurrences of the first location in the location table is above a threshold number in a week period. The operations may further include determining a first count of weeks for which the total number of day-wise occurrences for the first location is above the threshold number and determining the first location as a user's home location based on whether the determined first count of weeks is above a threshold number of weeks.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Reference will now be made in detail to specific aspects or features, examples of which are illustrated in the accompanying drawings. Wherever possible, corresponding or similar reference numbers will be used throughout the drawings to refer to the same or corresponding parts.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A system for providing location-based services, comprising:
   circuitry configured to:
      periodically acquire, over a period of a set of calendar dates, a plurality of location values of a portable electronic device or a vehicle associated with a user;
      determine a location tag for each location value of the plurality of location values, wherein the location tag indicates a type of built environment in each location value;
      create user location history of the user based on the acquired plurality of location values and the determined location tag;
      filter the user location history to:
         remove a first location value of the plurality of location values for which a first dwell time period is below a first set threshold period, and
         record a second location value of the plurality of location values for which a second dwell time period is equal to or greater than the first set threshold period, wherein the user location history is filtered based on a detection whether the vehicle is switched off for more than or equal to a second set threshold period;

select, from the filtered user location history of the user, a set of locations corresponding to the set of calendar dates, wherein each location of the selected set of locations is associated with a specific dwell time period that is greater than a first threshold time-period;

create a location table based on the selected set of locations and the set of calendar dates;

determine whether a total number of day-wise occurrence of a first location in the location table is above a threshold number in a week period;

select the first location from the location table based on the determination that the total number of day-wise occurrence of the first location in the location table is above the threshold number in the week period;

determine a first count of weeks for which the total number of day-wise occurrence for the selected first location is above the threshold number;

determine the selected first location as a user home location of the user based on the determined first count of weeks that is above a threshold number of weeks;

provide, via a communication network, the user home location to a service provider apparatus in a locality of the user home location;

receive, via the communication network from the service provider apparatus, user targeted content based on the provided user home location; and provide the received user targeted content to the vehicle or the portable electronic device associated with the user.

2. The system for providing the location-based services according to claim 1, wherein, for each location of the set of locations, the specific dwell time period is between an originating trip of a respective day and a last trip taken just before the originating trip.

3. The system for providing the location-based services according to claim 1, wherein the circuitry is further configured to:

determine a total number of days associated with the set of calendar dates;

compute a ratio of the total number of day-wise occurrence of the selected first location to the determined total number of days; and determine the selected first location as the user home location further based on whether the computed ratio is equal or above a threshold ratio.

4. The system for providing the location-based services according to claim 1, wherein the circuitry is further configured to:

determine, from the user location history, two or more locations for each calendar date of the set of calendar dates, wherein the specific dwell time period associated with each location of the determined two or more locations is greater than or equal to the first threshold time-period;

compute, for each location of the two or more locations, a total dwell time period over the period of the set of calendar dates; and validate the selected first location as the user home location based on whether the computed total dwell time period for the selected first location of the two or more locations is above a second threshold time-period.

5. The system for providing the location-based services according to claim 1, wherein the circuitry is further configured to:

determine a first date from the set of calendar dates as a holiday; and validate the selected first location as the user home location further based on a determination that the specific dwell time period for the selected first location is maximum on the determined first date.

6. The system for providing the location-based services according to claim 1, wherein the set of calendar dates corresponds to weekdays of at least a two-week period.

7. The system for providing the location-based services according to claim 1, wherein the circuitry is further configured to:

select a second location from the location table based on whether a total number of day-wise occurrence of the second location in the location table is above the threshold number in the week period;

determine a second count of weeks for which the total number of day-wise occurrence for the selected second location is above the threshold number; and update the user home location as the selected second location based on whether the determined second count of weeks is above the threshold number of weeks.

8. The system for providing the location-based services according to claim 1, wherein the circuitry is further configured to reject the first location in the location table as a candidate for the user home location based on whether the total number of day-wise occurrence of the first location in the location table is less than the threshold number in the week period.

9. The system for providing the location-based services of claim 1, wherein the circuitry is further configured to:

determine a change in the user home location based on the determination that the selected first location is different from a specific home location associated with vehicle registration information of the user; and determine a second location from the location table as the user home location based on the determination of the change.

10. The system for providing the location-based services according to claim 1, wherein the circuitry is further configured to:

retrieve, from a user database, electronic Customer Relationship Management (e-CRM) data of the user;

determine vehicle registration information of the user based on the retrieved e-CRM data;

determine whether a specific home location associated with the vehicle registration information matches with the first location determined as the user home location; and validate the selected first location as the user home location based on the determination that the specific home location associated with the vehicle registration information matches with the selected first location.

11. A computer-implemented method for providing location-based services, comprising:

periodically acquiring, over a period of a set of calendar dates, a plurality of location values of a portable electronic device or a vehicle associated with a user;

determining a location tag for each location value of the plurality of location values, wherein the location tag indicates a type of built environment in the each location value;
creating user location history of the user based on the acquired plurality of location values and the determined location tag;
filtering the user location history to:
remove a first location value of the plurality of location values for which a first dwell time period is below a first set threshold period, and
record a second location value of the plurality of location values for which a second dwell time period is equal to or greater than the first set threshold period, wherein
the user location history is filtered based on a detection whether the vehicle is switched off for more than or equal to a second set threshold period;
selecting, from the filtered user location history of the user, a set of locations corresponding to the set of calendar dates, wherein each location of the selected set of locations is associated with a specific dwell time period that is greater than a first threshold time-period;
creating a location table based on the selected set of locations and the set of calendar dates;
determining whether a total number of day-wise occurrence of a first location in the location table is above a threshold number in a week period;
selecting the first location from the location table based on the determination that the total number of day-wise occurrence of the first location in the location table is above the threshold number in the week period;
determining a first count of weeks for which the total number of day-wise occurrence for the selected first location is above the threshold number;
determining the selected first location as a user home location of the user based on the determined first count of weeks that is above a threshold number of weeks;
providing, via a communication network, the user home location to a service provider apparatus in a locality of the user home location;
receiving, via the communication network from the service provider apparatus, user targeted content based on the provided user home location; and
providing the received user targeted content to the vehicle or the portable electronic device associated with the user.

12. The computer-implemented method for providing the location-based services according to claim 11, wherein, for each location of the set of locations, the specific dwell time period is between an originating trip of a respective day and a last trip taken just before the originating trip.

13. The computer-implemented method for providing the location-based services according to claim 11, further comprising:
determining a total number of days associated with the set of calendar dates;
computing a ratio of the total number of day-wise occurrence of the selected first location to the determined total number of days; and
determining the selected first location as the user home location further based on whether the computed ratio is equal to or above a threshold ratio.

14. The computer-implemented method for providing the location-based services according to claim 11, further comprising:
determining, from the user location history, two or more locations for each calendar date of the set of calendar dates,
wherein the specific dwell time period associated with each location of the determined two or more locations is greater than or equal to the first threshold time-period;
computing, for each location of the two or more locations, a total dwell time period over the period of the set of calendar dates; and
validating the selected first location as the user home location based on whether the computed total dwell time period for the selected first location of the two or more locations is above a second threshold time-period.

15. The computer-implemented method for providing the location-based services according to claim 11, further comprising:
determining a first date from the set of calendar dates as a holiday; and
validating the selected first location as the user home location further based on a determination that the specific dwell time period for the selected first location is maximum on the determined first date.

16. The computer-implemented method for providing the location-based services according to claim 11, further comprising:
selecting a second location from the location table based on whether a total number of day-wise occurrence of the second location in the location table is above the threshold number in the week period;
determining a second count of weeks for which the total number of day-wise occurrence for the selected second location is above the threshold number; and
updating the user home location as the selected second location based on whether the determined second count of weeks is above the threshold number of weeks.

17. A non-transitory computer-readable medium having stored thereon computer implemented instructions that, when executed by a system, causes the system to execute operations for providing location-based services, the operations comprising:
periodically acquiring, over a period of a set of calendar dates, a plurality of location values of a portable electronic device or a vehicle associated with a user;
determining a location tag for each location value of the plurality of location values, wherein the location tag indicates a type of built environment in the each location value;
creating user location history of the user based on the acquired plurality of location values and the determined location tag;
filtering the user location history to:
remove a first location value of the plurality of location values for which a first dwell time period is below a first set threshold period, and
record a second location value of the plurality of location values for which a second dwell time period is equal to or greater than the first set threshold period, wherein
the user location history is filtered based on a detection whether the vehicle is switched off for more than or equal to a second set threshold period;
selecting, from the filtered user location history of the user, a set of locations corresponding to the set of calendar dates, wherein each location of the selected set of locations is associated with a specific dwell time period that is greater than a first threshold time-period;

creating a location table based on the selected set of locations and the set of calendar dates;

determining whether a total number of day-wise occurrence of a first location in the location table is above a threshold number in a week period;

selecting the first location from the location table based on the determination that the total number of day-wise occurrence of the first location in the location table is above the threshold number in the week period;

determining a first count of weeks for which the total number of day-wise occurrence for the selected first location is above the threshold number;

determining the selected first location as a user home location of the user based on the determined first count of weeks that is above a threshold number of weeks;

providing, via a communication network, the user home location to a service provider apparatus in a locality of the user home location;

receiving, via the communication network from the service provider apparatus, user targeted content based on the provided user home location; and providing the received user targeted content to the vehicle or the portable electronic device associated with the user.

* * * * *